United States Patent
Matsui et al.

(10) Patent No.: US 8,187,531 B2
(45) Date of Patent: May 29, 2012

(54) WIRE FOR WELDING NICKEL BASED HEAT RESISTANT ALLOY

(75) Inventors: Takanori Matsui, Saitama (JP); Komei Kato, Saitama (JP); Takuya Murai, Kounosu (JP); Yoshitaka Uemura, Takasago (JP); Daisuke Yoshida, Takasago (JP); Ikuo Okada, Takasago (JP)

(73) Assignees: Mitsubishi Materials Corporation, Tokyo (JP); Mitsubishi Heavy Industries, Ltd., Tokyo (JP)

( * ) Notice: Subject to any disclaimer, the term of this patent is extended or adjusted under 35 U.S.C. 154(b) by 678 days.

(21) Appl. No.: 12/296,743

(22) PCT Filed: Apr. 16, 2007

(86) PCT No.: PCT/JP2007/058256
§ 371 (c)(1),
(2), (4) Date: Oct. 10, 2008

(87) PCT Pub. No.: WO2007/119847
PCT Pub. Date: Oct. 25, 2007

(65) Prior Publication Data
US 2009/0123328 A1 May 14, 2009

(30) Foreign Application Priority Data

Apr. 14, 2006 (JP) ................................. 2006-111750
Apr. 9, 2007 (JP) ................................. 2007-101375

(51) Int. Cl.
*C22C 19/05* (2006.01)

(52) U.S. Cl. ........................................ 420/448; 420/449
(58) Field of Classification Search .................. 420/448, 420/449
See application file for complete search history.

(56) References Cited

U.S. PATENT DOCUMENTS

| | | | |
|---|---|---|---|
| 3,917,463 A * | 11/1975 | Doi et al. | ........................ 75/236 |
| 6,106,767 A | 8/2000 | Kennedy et al. | |
| 6,302,649 B1 | 10/2001 | Mukira et al. | |
| 2003/0005981 A1 * | 1/2003 | Ogawa et al. | ................. 148/428 |
| 2006/0051234 A1 | 3/2006 | Pike | |

FOREIGN PATENT DOCUMENTS

| JP | 61073853 | 4/1986 |
|---|---|---|
| JP | 1129942 | 5/1989 |
| JP | 2000502405 | 2/2000 |
| JP | 2001-158929 A | 6/2001 |
| JP | 2002235136 | 8/2002 |
| JP | 2002239697 | 8/2002 |
| JP | 2006070360 | 3/2006 |

* cited by examiner

*Primary Examiner* — Jessica L Ward
*Assistant Examiner* — Alexander Polyansky
(74) *Attorney, Agent, or Firm* — Leason Ellis LLP.

(57) ABSTRACT

A wire for welding Ni-based heat resistant alloy, comprising: a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, B: 0.0001 to 0.020%, C: 0.03 to 0.15%, and a balance of Ni and unavoidable impurities, wherein a content of S and P contained in the unavoidable impurities is controlled to be, in mass %, S: 0.004% or less, and P: 0.010% or less, wherein the wire has a texture in which $M_6C$ type carbide and MC type carbide are uniformly dispersed in the matrix.

7 Claims, No Drawings

WIRE FOR WELDING NICKEL BASED HEAT RESISTANT ALLOY

CROSS-REFERENCE TO PRIOR APPLICATION

This is the U.S. National Phase Application under 35 U.S.C. §371 of International Patent Application No. PCT/JP2007/058256 filed Apr. 16, 2007, which claims the benefit of Japanese Patent Application Nos. 2006-111750 filed Apr. 14, 2006 and 2007-101375 filed Apr. 9, 2007, all of which are incorporated by reference herein. The International Application was published in Japanese on Oct. 25, 2007 as WO2007/119847 al under pct article 21(2).

TECHNICAL FIELD

The present invention relates to a wire for welding a Ni-base heat resistant alloy, for example, used in welding in production and repair of machine parts made of a Ni-based heat resistant alloy, especially machine parts made of a precipitation strengthened type Ni-based heat resistant alloy. Specifically, the present invention relates to a wire for welding Ni-based heat resistant alloy, used in production and repair of various machine parts of a gas turbine efficiently.

BACKGROUND ART

It is generally known to produce various mechanical parts of a gas turbine from a Ni-based heat resistant alloy. For example, heat resistant alloys having the following compositions in mass % are known as the Ni-based heat resistant alloy that constitutes the various mechanical parts: a Ni-based heat resistant alloy composed of 19.5% of Cr, 13.5% of Co, 4.3% of Mo, 1.4% of Al, 3% of Ti, 0.6% of C, 0.05% of Zr, 0.006% of B, and a balance of Ni; Ni-based heat resistant alloy composed of 19% of Cr, 11% of Co, 9.8% of Mo, 1.5% of Al, 3.2% of Ti, 0.09% of C, 0.07% of B, and a balance of Ni; a Ni-based heat resistant alloy composed of 19% of Cr, 12% of Co, 6% of Mo, 1% of W, 2% of Al, 3% of Ti, 0.03% of C, 0.007% of B, and a balance of Ni; and Ni-based heat resistant alloy composed of 16% of Cr, 8.5% of Co, 1.8% of Mo, 2.6% of W, 1.8% of Ta, 0.9% of Nb, 3.5% of Al, 3.5% of Ti, 0.11% of C, 0.05% of Zr, 0.01% of B, and a balance of Ni.

The various mechanical parts of a gas turbine composed of the Ni-based heat resistant alloys are produced through welding. A welding wire having a composition composed of, in mass %, Cr: 18 to 22%, Co: 10% or less, Al: 0.2 to 0.7%, one or two selected from Ta, Mo, and W: 15 to 28%, C: 0.09% or less, Zr: 0.06% or less, B: 0.015% or less, Ma: 0.4 to 1.2%, Si: 0.2 to 0.45%, and a balance of Ni and unavoidable impurities is provided as an example of a wire for welding the Ni-based heat resistant alloy. It is described that this wire for welding Ni-based heat resistant alloy can be subjected to TIG welding or MIG welding under a room temperature, that is, without preliminary heating the parts to be repaired, and the weld zone has excellent ductility, satisfactory oxidation resistance, and high-temperature tensile strength and creep resistance that fulfill the requirement (Patent reference 1: Japanese Unexamined Patent Application, First Publication No. 2001-158929).

DISCLOSURE OF INVENTION

Problems to be Solved by the Invention

Recently, it is required to reduce the production cost of various mechanical parts by enhancing the production speed through welding, and to enhance the speed of repairing operation by welding. In the same time, in accordance with increasing temperature of the service condition, it is required to improve high temperature strength of the weld portion. Therefore, it is tried to perform the welding under further increased output power so as to enhance the welding speed, thereby performing the welding operation rapidly and efficiently. However, when the welding speed is increased, the weld portion tends to occur weld metal cracking caused by misrun of molten metal. The weld metal cracking is specifically remarkable when a welding rod for providing high temperature strength is used. Therefore, speed-enhancement of production and repair through welding of various mechanical pats made of a Ni-based heat resistant alloy has been inhibited.

Device for Solving the Problems

The inventors carried out research so as to solve the above-described problems, and achieved results of the research as described in the following (A) to (D).

(A) Compared to the conventional wire for welding Ni-based heat resistant alloy, a wire having the below-described composition and texture can be used in a high speed welding of various mechanical parts made of a Ni-based heat resistant alloy with a lower possibility to occur weld-metal cracking mainly caused by misrun of molten metal in a weld zone. The wire for welding Ni-based heat resistant alloy, has a composition containing, in mass %, Cr: 14.0 to 21.5%, Co: 6-5 to 14.5%, Mo: 6.5 to 10.0%, W: 1-5 to 3.5%, Al: 1.2 to 2.4%, Ti: 1.1 to 2.1%; Fe: 7.0% or less, B: 0.0001 to 0.020%, C: 0.03 to 0.15%, further containing Nb: 0.1 to 1.0% according to need, and a balance of Ni and unavoidable impurities, wherein a content of S and P contained in the unavoidable impurities is controlled to be, in mass %, S: 0.004% or less, and P: 0.010% or less, wherein the wire has a texture in which $M_6C$ type carbide and MC type carbide are uniformly dispersed in γ phase matrix.

(B) Preferably, the M in the $M_6C$ type carbide has a composition containing, in mass %, Ni: 12.0 to 45.0%, Cr: 9.0 to 22.0%, Co: 0.5 to 13.5%, W: 2.0 to 24.0%, Al: 5.0% or less, Ti: 0.5 to 6.0%, further containing Nb: 1.0% or less according to need, and a balance consisting of Mo and unavoidable impurities.

The M in the MC type carbide preferably has a composition containing, in mass %, Ni: 7.0% or less Cr: 6.0% or less, Co: 12.0% or less, Mo: 57.0% or less, W: 15% or less, Al: 6.0% or less, further containing Nb: 65% or less according to need, and a balance consisting of Ti and unavoidable impurities.

(C) It is more preferable that the $M_6C$ type carbide and MC type carbide has an average grain diameter of 0.3 to 4.0 μm, and that the $M_6C$ type carbide and the MC type carbide are uniformly dispersed in the matrix is 0.5 to 16.0 area % at a total area.

(D) A welding wire that satisfies the above-described conditions (A) to (C) can be used in high-speed welding without accompanying weld-metal cracking, provides weld-zone excellent in high-temperature tensile strength and high-temperature ductility; and can be applied to MIG welding.

The present invention was carried out based on the above-described research results and has the below-described aspects.

(1) A first aspect of the present invention is a wire for welding Ni-based heat resistant alloy, the wire comprising a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, B: 0.0001 to 0.020%, C: 0.03 to 0.15%, and a balance of Ni and unavoidable impurities, wherein a content of S and P contained in the unavoidable impurities is controlled, in mass %, S: 0.004% or less, and P: 0.010% or less, wherein the wire has a texture in which $M_6C$ type carbide and MC type carbide are uniformly dispersed in γ phase matrix.

(2) A second aspect of the present invention is a wire for welding Ni-based heat resistant alloy, comprising a composition containing, in mass %, Cr: 14.0 to 21.5%, Co: 6.5 to 14.5%, Mo: 6.5 to 10.0%; W: 1.5 to 3.5%, Al: 1.2 to 2.4%, Ti: 1.1 to 2.1%; Fe: 7.0% or less, Nb: 0.1 to 1.0%, B: 0.0001 to 0.020%, C: 0.03 to 0.15%, and a balance of Ni and unavoidable impurities, wherein a content of S and P contained in the unavoidable impurities are controlled, in mass %, S: 0.004% or less, and P: 0.010% or less, where the wire has a texture in which $M_6C$ type carbide and MC type carbide are uniformly dispersed in γ phase matrix.

(3) A third aspect of the present invention is a wire for welding Ni-based heat resistant alloy according to the above-described first aspect, wherein the M in the $M_6C$ type carbide has a composition containing, in mass %, Ni: 12.0 to 45.0%, Cr: 9.0 to 22.0%, Co: 0.5 to 13.5%, W: 2.0 to 24.0%, Al: 5.0% or less, Ti: 0.5 to 6.0%, and a balance consisting of Mo and unavoidable impurities, and the M in the MC type carbide has a composition containing, in mass %, Ni: 7.0% or less Cr: 6.0% or less, Co, 12.0% or less, Mo: 57.0% or less, W: 15% or less, Al: 6.0% or less, and a balance consisting of Ti and unavoidable impurities.

(4) A fourth aspect of the present invention is a wire for welding Ni-based heat resistant alloy according to the above-described second aspect, wherein the M in the $M_6C$ type carbide has a composition containing, in mass %, Ni: 12.0 to 45.0%, Cr: 9.0 to 22.0%, Co: 0.5 to 135%, W: 2.0 to 24.0%, Al: 5.0% or less, Ti: 0.5 to 6.0%, Nb: 1.0% or less, and a balance consisting of Mo and unavoidable impurities, and the M in the MC type carbide has a composition containing, in mass %, Ni: 7.0% or less, Cr: 6-0% or less, Co: 12.0% or less, Mo: 57.0% a or less, Nb: 65% or less, W: 15% or less, Al: 6.0% or less, and a balance consisting of Ti and unavoidable impurities.

(5) A fifth aspect of the present invention is a wire for welding Ni-based heat resistant alloy according to any one of the above-described first, second, third, and fourth aspects, wherein each of the $M_6C$ type carbide and the MC type carbide have an average grain diameter of 0.3 to 4.0 μm, and the $M_6C$ type carbide and the MC type carbide are uniformly dispersed in the matrix at a total proportion of 0.5 to 16.0 area %.

A wire for welding Ni based heat resistant alloy according to the present invention, having the above-described composition and a texture in which $M_6C$ type carbide and MC type carbide are uniformly dispersed in the matrix can be obtained by the following production method. Firstly, molten alloy is formed by melting Ni-based heat resistant alloy having a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, B: 0.0001 to 0.020%, C: 0.03 to 0.15%, further containing, in mass %, Nb: 0.1 to 1.0% according to need, and a balance consisting of Ni and unavoidable impurities, wherein a content of S and P contained in the unavoidable impurities is controlled to be, in mass %, S: 0.004% or less, and P: 0.010% or less. An ingot is obtained from the molten alloy. In a step of subjecting the thus obtained ingot to repeated hot-working including hot-forging and hot-rolling, after heating the ingot to a temperature within a range from γ' solvus (solves temperature of γ' phase)+20° C. to γ' solvus +200° C., working to a desired product region by a working ratio of 15% or more is performed at least two times or more in a temperature range from the heating temperature to γ' solvus −150° C. Where necessary, the work is subjected to cold working. After that, the work is subjected to solution treatment by heating the work to a temperature within a range from γ' solvus +20° C. to γ' solvus +200° C., and subsequently cooling the work. Thus, a wire for welding Ni based heat resistant alloy according to the present invention, having the above-described composition and a texture in which $M_6C$ type carbide and MC type carbide are uniformly dispersed in the matrix is obtained.

Next, the reason for the above-described limitation for the composition and the texture of the wire for welding the Ni-based heat resistant alloy according to the present invention is explained in the following.

[I] Composition (a) Chromium (Cr)

A Cr component enhances the high temperature corrosion resistance such as high temperature oxidation resistance and high temperature sulfidization resistance of the alloy by forming a satisfactory protection film, and improves flowability of molten metal by forming $M_6C$ type carbide and MC type carbide with C. However, if the content of Cr in mass % is less than 14.0%, sufficient high-temperature oxidation resistance and high-temperature corrosion resistance cannot be ensured. On the other hand, if the content of Cr exceeds 21.5%, disadvantageous phases such as C phase and μ phase are generated, thereby deteriorating the high-temperature oxidation resistance and high-temperature corrosion resistance. Therefore, content of Cr was determined to be 14.0 to 21.5% in mass %. A more preferable range of the Cr content is 15.5 to 20.0% in mass %.

(b) Cobalt (Co)

A Co component is mainly solid-solubilized in the matrix (γ phase) and enhances the creep property, and improves flowability of molten metal by forming MC type carbide. However, if Co content is less than 6.5% in mass %, it is not preferable since sufficient creep property cannot be provided. On the other hand, if the Co content exceeds 14.5%, it is not preferable since hot-workability and cold-workability is reduced and high temperature ductility during the use of combustor or the like is deteriorated. Therefore, content of Co was determined to be 6.5 to 14.5% in mass %. A more preferable range of Co content is 7.5 to 13.5% in mass %.

(c) Molybdenum (Mo)

A Mo content has an effect of improving high temperature tensile property, creep property, and creep fatigue property, by being solid-solubilized in the matrix (γ phase). The effect exhibits combined-effect by the coexistence with W. Further Mo has an effect of improving flowability by forming $M_6C$ type carbide and MC type carbide with C. However, if Mo content is less than 6.5% in mass %, sufficient high temperature ductility and creep fatigue property cannot be provided. On the other hand, if Mo content exceeds 10.0%, it is not preferable since the hot-workability and cold-workability are deteriorated and disadvantageous phases such as μ phase are precipitated, thereby causing brittleness and deteriorating weldability. Therefore, the Mo content was determined to be 6.5 to 10.0% in mass %. A more preferable range of Mo content is 7.0 to 9.5% in mass %.

(d) Tungsten (W)

A W component is solid-solubilized in the matrix (γphase) and γ' phase, and improves the high-temperature tensile property, the creep property, and the creep fatigue property. Under the coexistence with Mo, W exhibits a combined strengthening by solid-solution strengthening of the matrix. Further, W forms $M_6C$ type carbide and MC type carbide with C and improves the flowability of molten metal. However, where W content is less than 1.5% in mass %, a sufficient high-temperature ductility and creep fatigue property cannot be provided. On the other hand, if the W content exceeds 3.5%, it is not preferable since hot workability and cold workability are deteriorated, and weldability is deteriorated. Therefore, the W content was determined to be 1.5 to 3.5% in mass %. More preferable range of W content is 2.0 to 3.0% in mass %.

(e) Aluminum (Al)

By suffering the aging treatment, the Al component constitutes γ' phase ($Ni_3Al$) as a main precipitation strengthening phase, and improves high-temperature tensile property, creep property, and creep fatigue property. However, where the Al content is less than 1.2% in mass %, it is impossible to ensure a desired high temperature strength because of insufficient precipitation ratio of the γ' phase. On the other hand, if the Al content exceeds 2.4%, it is not preferable since hot workability and cold workability are deteriorated and γ' phase has an excessive amount, thereby deteriorating ductility and deteriorating weldability. Therefore, Al content was determined to be 1.2 to 2.4% in mass %. A more preferable range of Al content is 1.4 to 2.2% in mass %.

(f) Titanium (Ti)

A Ti component is mainly solid-solubilized in γ' phase and improves high-temperature tensile property, creep property, creep fatigue property, and improves flowability of molten metal by forming MC type carbide with C. However, if the Ti content is less than 1.1%, desired high-temperature strength cannot be ensured because of insufficient precipitation ratio of the γ' phase. On the other hand, if the Ti content exceeds 2.1%, it is not preferable since hot-workability and cold workability are deteriorated. Therefore, Ti content was determined to be 1.1 to 2.1% in mass %. A more preferable range of Ti content is 1.3 to 1.9% in mass %.

(g) Boron (B)

A B component forms $M_3B_2$ type boride with Cr, Mo and the like, thereby improving flowability of molten metal. However, where the B content is less than 0.0001% in mass %, sufficient flowability of molten metal cannot be obtained because of insufficient amount of boride. On the other hand, where B content exceeds 0.020%, it is not preferable since too excessive amount of boride is generated, thereby deteriorating hot-workability, cold-workability, and weldability and the like. Therefore, B content was determined to be 0.0001 to 0.020% in mass %. A more preferable range of B content is 0.0002 to 0.010% in mass.

(h) Carbon (C)

A C component forms $M_6C$ type and MC type carbides with Ti, Mo and the like and improves flowability of molten metal, thereby improving the welding speed. However, where the C content is less than 0.03% in mass %, it is impossible to obtain sufficient flowability of molten metal because of an insufficient precipitation ratio of $M_6C$ type and MC type carbides. On the other hand, if the C content exceeds 0.15%, it is not preferable since too excessive amount of carbides are generated thereby deteriorating hot-workability, cold-workability and weldability. Therefore, the C content was determined to be 0.03 to 0.15% in mass %. A more preferable range of the C content is 0.05 to 0.12% in mass %.

(i) Iron (Fe)

Where necessary, an Fe component is added since Fe is inexpensive and cost-effective and has an effect of improving hot-workability. However, if the Fe content exceeds 7% in mass %, it is not preferable since the weldability and the high temperature strength are deteriorated. Therefore, the Fe content was determined to be 7.0% or less (including 0%) in mass %, more preferably, 4% or less in mass %.

(j) Sulfur (S) and Phosphorus (P)

Both of S and P segregate in the grain boundaries in the time of high-speed welding and cause weld-metal cracking. This tendency is especially remarkable under the coexistence of C.

Therefore, it is preferable to control S and P contents to be as low as possible. However, as the upper limit of content, at most; 0.004% in mass % is allowable for S, and 0.010% is allowable for P. Therefore, S and P contents were determined to be S≦0.004% and P≦0.010% in mass %, more preferably, S≦0.004% and P≦0.008%.

(k) Niobium (Nb)

A Nb component is solid-solubilized in the matrix (γ phase) and γ' phase, and improves the high temperature tensile property, the creep property, the creep fatigue property, thereby providing high temperature strength. Further, Nb forms MC type carbide with C and improves flowability of molten metal. Therefore, Nb is added according to need. However, where the Nb content is less than 0.1% in mass %, it is impossible to provide sufficient creep fatigue property. On the other hand, if Nb content exceeds 1.0%, it is not preferable since hot-workability, cold-workability, and weldability are deteriorated. Therefore, the Nb content was determined to be 0.1 to 1.0% in mass %. More preferable range of Nb content is 0.2 to 0.8% in mass %.

[II] Carbide

A ingot is obtained by melting and pouring Ni-based heat resistant alloy comprising a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, B: 0.0001 to 0.020%, C: 0.03 to 0.15%, further containing Nb: 0.1 to 1.0% according to need, and a balance consisting of Ni and unavoidable impurities, wherein a content of S and P contained in the unavoidable impurities is controlled, in mass %, S: 0.004% or less, and P: 0.010% or less. In a step of subjecting the thus obtained ingot to repeated hot working including hot-forging and hot-rolling, after heating the ingot to a temperature within a range from γ' solvus (solvus of γ' phase) +20° C. to γ' solvus +200° C., the ingot is worked to a desired product region at a working ratio of 15% or more at least two times or more in a temperature range from the heating temperate to γ' solvus −150° C. Where necessary, the work (worked ingot) is subjected to cold working. After that the work is subjected to solution treatment by heating the work to a temperature within a range from γ' solvus +20° C. to γ' solvus +200° C., and subsequently cooling the work. In the wire for welding Ni-based heat resistant alloy formed by the above-described method, $M_6C$ type carbide and MC type carbide having an average grain diameter of 0.3 to 4.0 μm are formed in the matrix of Ni-based heat resistant alloy at an area % of 0.5 to 16.0%. The M in the $M_6C$ type carbide has a composition comprising, in mass %, Ni: 12.0 to 45.0%, Cr: 9.0 to 22.0%, Co: 0.5 to 13.5%, W: 2.0 to 24.0%, Al: 5.0% or less, Ti: 0.5 to 6.0%, further containing Nb: 1.0% or less according to need, and a balance consisting of Mo and unavoidable impurities. In addition, the M in the MC type carbide has a composition comprising, in mass %, Ni: 7.0% or less Cr: 6.0% or less, Co: 12.0% or less, Mo: 57.0% or less, W: 15% or less, Al: 6.0% or less, further containing Nb: 65% or less according to need, and a balance consisting of Ti and unavoidable impurities.

The thus formed $M_6C$ type carbide and the MC type carbide each have a effect of improving flowability of molten metal. Therefore, they may be uniformly dispersed in the matrix of the Ni-based heat resistant alloy in any proportion. However, when those carbides have an average grain diameter of less than 0.3 μm, and are dispersed in an area ratio of 0.5% or less, there is a case that a sufficient flowable effect cannot be exhibited. On the other hand, where carbides have an average grain diameter exceeding 4.0 μm, and are dispersed in an area ratio of more than 16.0%, alloying element easily segregates in the weld-zone and tends to cause deterioration of strength properties. Therefore, it is preferable that the $M_6C$ type carbide and the MC type carbide uniformly dispersed in the matrix of the Ni-based heat resistant alloy according to the present invention have an average gain diameter: 0.3 to 4.0 μm, and that the $M_6C$ type carbide and the MC type carbide are uniformly dispersed in the matrix at a total proportion of 0.5 to 16.0%.

Effect of the Invention

As described-above, the wire for welding according to the present invention may be used in effective welding of various mechanical parts of gas-turbine engine and the like, it is possible to further reduce the cost.

BEST MODE FOR CARRYING OUT THE INVENTION

Next, the wire of the present invention made of Ni-based heat resistant alloy is explained more specifically with reference to Examples.

Ingots each having a diameter of 100 mm and a height of 150 mm were produced by melting Ni-based alloy having a composition show in Tables 1 to 3 to form molten alloys, and casting the molten alloys. Round bars each having a diameter of 20 mm were produced by hot-forging the ingots.

Inventive wires (wires of the present invention) 1 to 28 and Comparative wires 1 to 18 were produced by cold-drawing the above-described round bars. Each round bar had a diameter of 2.4 mm, a composition shown in Tables 1 to 3, and a texture in which $M_6C$ type carbide and MC type carbide having an average grain diameter shown in Tables 4 to 6 were uniformly dispersed in the matrix in an area ratio shown in Tables 4 to 6. Further, a conventional wire having a composition described in Patent Reference 1, containing Cr: 20.75%, Co: 6%, Al: 0.42%, Ta: 0.07%, W: 18.55%; C: 0.06%, Zr: 0.02%, B: 0.01%, Mn: 0.67%, Si: 0.38%, and a balance consisting of Ni and unavoidable impurities was prepared.

Further, as an object to be weld, Ni-based heat resistant alloy plates having a composition, in mass %, of Cr: 19.5%, Co: 13.5%, Mo: 4.3%, Al: 1.4%, Ti: 3%, C: 0.06%, Zr: 0.05%, B: 0.007%, and a balance of Ni, and a plate thickness of 8 mm were prepared. Two blank plates were prepared by subjecting the above-described plates to edge preparation of 60°. The blank plates were butted against each other and arrested in that state on an arresting table having a thickness of 15 mm such that a Y-shaped groove was formed leaving a minimum spacing of 1 mm. The groove of the thus butted and arrested blank plates was subjected to TIG welding such that beads of 0.75 cm in length was formed under conditions of Electric current density: 120 A, welding speed: 5 cm/min, Electric current density: 120 A, welding speed: 10 cm/min, and
Electric current density: 120 A, welding speed: 15 cm/min. Absence or existence of weld metal cracking was observed by penetrating test method. The result was evaluated as A where the weld-metal cracking was absent, and the result was evaluated as B where the weld-metal cracking was existent. The results were listed in Tables 4 to 6. Each of the brazed members showing no weld-metal cracking were subjected to aging treatment under conditions of 850° C./24 h/A.C.+760° C./16 h/A.C., and a tensile test piece having a weld zone in the central portion of a parallel portion was prepared from the aged member. Using the tensile test pieces, high temperature tensile test was performed while retaining the test pieces at high temperature conditions of 800° C. The results are show in Tables 4 to 6. From the results shown in the Tables, the high-temperature tensile strength of the weld zones was evaluated

TABLE 1

| WIRE | | Cr | Co | Mo | W | Al | Ti | B | C | Fe | S | P | Nb | Ni |
|---|---|---|---|---|---|---|---|---|---|---|---|---|---|---|
| INVENTIVE | 1 | 18.4 | 12.4 | 8.1 | 2.4 | 1.6 | 1.7 | 0.003 | 0.08 | 0.1 | <0.001 | 0.002 | — | BALANCE |
| | 2 | 18.2 | 12.4 | 6.6 | 3.0 | 1.7 | 1.6 | 0.006 | 0.10 | 0.1 | <0.001 | 0.002 | — | BALANCE |
| | 3 | 18.0 | 12.5 | 7.1 | 2.9 | 1.9 | 1.4 | 0.002 | 0.12 | 0.1 | <0.001 | <0.001 | — | BALANCE |
| | 4 | 18.9 | 12.2 | 7.4 | 2.4 | 1.8 | 1.6 | 0.003 | 0.15 | 0.1 | <0.001 | <0.001 | — | BALANCE |
| | 5 | 14.3 | 11.8 | 7.7 | 2.5 | 1.7 | 1.7 | 0.004 | 0.09 | 0.2 | 0.001 | 0.002 | — | BALANCE |
| | 6 | 19.2 | 11.5 | 8.1 | 2.3 | 1.5 | 1.8 | 0.003 | 0.07 | 0.2 | 0.002 | 0.001 | — | BALANCE |
| | 7 | 18.1 | 12.3 | 8.5 | 2.6 | 1.9 | 1.5 | 0.018 | 0.04 | 0.1 | <0.001 | <0.001 | — | BALANCE |
| | 8 | 18.3 | 12.2 | 8.8 | 2.4 | 1.6 | 1.8 | 0.003 | 0.08 | 0.1 | <0.001 | <0.001 | — | BALANCE |
| | 9 | 21.3 | 11.6 | 9.0 | 2.5 | 1.6 | 1.6 | 0.005 | 0.09 | 0.1 | 0.001 | 0.001 | — | BALANCE |
| | 10 | 18.5 | 12.1 | 9.3 | 2.6 | 1.7 | 1.6 | 0.004 | 0.08 | 0.1 | <0.001 | <0.001 | — | BALANCE |
| | 11 | 18.8 | 12.0 | 9.6 | 2.4 | 1.5 | 1.7 | 0.003 | 0.07 | 0.2 | 0.001 | 0.002 | — | BALANCE |
| | 12 | 18.6 | 11.5 | 9.9 | 2.2 | 1.6 | 1.8 | 0.004 | 0.06 | 0.1 | 0.001 | 0.002 | 0.2 | BALANCE |
| | 13 | 18.2 | 12.4 | 8.5 | 1.7 | 1.9 | 1.3 | 0.005 | 0.10 | 0.1 | <0.001 | <0.001 | 0.7 | BALANCE |
| | 14 | 19.0 | 12.2 | 8.2 | 1.9 | 1.7 | 1.4 | 0.004 | 0.08 | 0.1 | 0.002 | 0.003 | 0.5 | BALANCE |
| | 15 | 16.9 | 8.9 | 7.5 | 2.5 | 1.8 | 1.7 | 0.004 | 0.08 | 0.3 | <0.001 | 0.002 | 0.5 | BALANCE |

TABLE 2

| WIRE | | Cr | Co | Mo | W | Al | Ti | B | C | Fe | S | P | Nb | Ni |
|---|---|---|---|---|---|---|---|---|---|---|---|---|---|---|
| INVENTIVE | 16 | 18.7 | 12.3 | 8.2 | 3.1 | 1.6 | 1.7 | 0.002 | 0.09 | 0.2 | 0.001 | 0.003 | — | BALANCE |
| | 17 | 18.9 | 11.9 | 8.0 | 3.3 | 1.4 | 1.9 | 0.004 | 0.10 | 0.2 | 0.002 | 0.004 | — | BALANCE |
| | 18 | 18.5 | 12.6 | 8.4 | 2.7 | 2.3 | 1.2 | 0.005 | 0.11 | 0.2 | 0.001 | 0.002 | — | BALANCE |
| | 19 | 18.6 | 14.3 | 8.5 | 2.4 | 1.5 | 1.5 | 0.004 | 0.08 | 0.1 | <0.001 | <0.001 | — | BALANCE |

TABLE 2-continued

| | WIRE | Cr | Co | Mo | W | Al | Ti | B | C | Fe | S | P | Nb | Ni |
|---|---|---|---|---|---|---|---|---|---|---|---|---|---|---|
| | 20 | 18.4 | 6.7 | 8.2 | 2.5 | 1.8 | 1.8 | 0.003 | 0.08 | 0.1 | <0.001 | <0.001 | — | BALANCE |
| | 21 | 17.8 | 11.6 | 8.1 | 2.3 | 1.3 | 2.0 | 0.003 | 0.10 | 0.2 | <0.001 | 0.001 | — | BALANCE |
| | 22 | 15.6 | 12.2 | 8.3 | 2.2 | 2.1 | 1.4 | 0.008 | 0.06 | 0.2 | <0.001 | <0.001 | — | BALANCE |
| | 23 | 19.8 | 11.8 | 8.4 | 2.5 | 1.7 | 1.6 | 0.003 | 0.09 | 0.2 | 0.002 | 0.003 | — | BALANCE |
| | 24 | 18.4 | 7.6 | 8.1 | 2.4 | 1.6 | 1.7 | 0.004 | 0.08 | 0.1 | 0.001 | 0.001 | — | BALANCE |
| | 25 | 18.0 | 13.4 | 8.2 | 2.4 | 1.5 | 1.7 | 0.004 | 0.08 | 0.2 | <0.001 | 0.001 | — | BALANCE |
| | 26 | 18.5 | 12.0 | 8.5 | 1.7 | 1.8 | 1.8 | 0.003 | 0.09 | 0.2 | 0.001 | 0.002 | — | BALANCE |
| | 27 | 18.9 | 12.3 | 8.3 | 2.4 | 1.5 | 1.7 | 0.0002 | 0.08 | 0.2 | <0.001 | 0.002 | — | BALANCE |
| | 28 | 18.3 | 12.0 | 8.3 | 2.4 | 1.6 | 1.7 | 0.0004 | 0.09 | 0.1 | 0.001 | 0.003 | — | BALANCE |
| COMPARATIVE | 1 | 21.6* | 10.2 | 9.8 | 3.3 | 2.0 | 1.8 | 0.004 | 0.08 | 1.0 | 0.008 | 0.010 | 0.8 | BALANCE |
| | 2 | 13.9* | 13.8 | 7.3 | 1.8 | 1.2 | 1.4 | 0.003 | 0.04 | 0.2 | <0.001 | 0.001 | 0.2 | BALANCE |
| | 3 | 20.3 | 14.6* | 8.9 | 2.9 | 2.3 | 1.9 | 0.006 | 0.11 | 1.5 | 0.002 | 0.002 | 0.7 | BALANCE |
| | 4 | 14.7 | 6.4* | 7.1 | 1.9 | 1.4 | 1.1 | 0.002 | 0.05 | 0.1 | 0.004 | 0.002 | 0.3 | BALANCE |

*MARK DENOTES A VALUE OUTSIDE THE RANGE OF THE PRESENT INVENTION.

TABLE 3

| | WIRE | Cr | Co | Mo | W | Al | Ti | B | C | Fe | S | P | Nb | Ni |
|---|---|---|---|---|---|---|---|---|---|---|---|---|---|---|
| COMPARATIVE | 5 | 19.5 | 13.5 | 10.1* | 3.4 | 2.2 | 1.9 | 0.009 | 0.13 | 0.2 | 0.002 | 0.004 | — | BALANCE |
| | 6 | 18.4 | 7.2 | 6.4* | 1.7 | 1.3 | 1.3 | 0.002 | 0.04 | 0.1 | <0.001 | 0.001 | — | BALANCE |
| | 7 | 19.2 | 13.7 | 9.9 | 3.6* | 2.2 | 2.0 | 0.007 | 0.14 | 0.1 | 0.002 | 0.002 | — | BALANCE |
| | 8 | 18.3 | 7.5 | 6.6 | 1.4* | 1.3 | 1.2 | 0.003 | 0.03 | 0.2 | <0.001 | <0.001 | — | BALANCE |
| | 9 | 18.7 | 13.2 | 9.7 | 3.2 | 2.5* | 2.0 | 0.008 | 0.13 | 0.2 | <0.001 | <0.001 | — | BALANCE |
| | 10 | 19.3 | 6.9 | 6.6 | 1.7 | 1.1* | 1.2 | 0.002 | 0.05 | 0.4 | 0.002 | 0.003 | — | BALANCE |
| | 11 | 20.5 | 13.6 | 9.8 | 3.3 | 2.2 | 2.2* | 0.011 | 0.12 | 0.3 | 0.003 | 0.002 | — | BALANCE |
| | 12 | 18.6 | 6.8 | 6.7 | 1.6 | 1.4 | 1.0* | 0.003 | 0.06 | 0.5 | 0.001 | 0.001 | — | BALANCE |
| | 13 | 20.8 | 12.3 | 9.1 | 3.1 | 1.9 | 2.0 | 0.021* | 0.14 | 0.2 | 0.003 | 0.004 | — | BALANCE |
| | 14 | 20.2 | 7.9 | 7.0 | 1.9 | 1.3 | 1.3 | 0.00005* | 0.03 | 0.4 | 0.002 | 0.003 | — | BALANCE |
| | 15 | 19.5 | 13.2 | 9.8 | 3.2 | 2.1 | 1.9 | 0.006 | 0.16* | 0.5 | 0.002 | 0.003 | — | BALANCE |
| | 16 | 15.0 | 7.9 | 6.8 | 1.6 | 1.5 | 1.1 | 0.003 | 0.02* | 0.2 | <0.001 | <0.001 | — | BALANCE |
| | 17 | 20.7 | 13.0 | 9.6 | 2.9 | 2.2 | 1.9 | 0.005 | 0.10 | 3.2 | 0.015 | 0.010 | — | BALANCE |
| | 18 | 21.1 | 12.8 | 9.8 | 3.3 | 2.0 | 2.0 | 0.006 | 0.15 | 2.9 | 0.012 | 0.015 | — | BALANCE |
| CONVENTIONAL | | 20.8 | 6.0 | — | 17.1 | 0.4 | — | 0.01 | 0.01 | Zr: 0.02, Mn: 0.7, Si: 0.4 | | | | BALANCE |

*MARK DENOTES A VALUE OUTSIDE THE RANGE OF THE PRESENT INVENTION

TABLE 4

| | | M$_6$C TYPE AND MC TYPE CARBIDE | | ABSENCE OR EXISTENCE OF WELD-METAL CRACKING IN ACCORDANCE WITH DIFFERENCE IN WELDING SPEED WELDING SPEED (cm/min.) | | | HIGH-TEMPERATURE TENSILE TEST | | |
|---|---|---|---|---|---|---|---|---|---|
| | | AVERAGE GRAIN DIAMETER | AREA RATIO | | | | 0.2% PROOF STRESS | TENSILE STRENGTH | FRACTURE ELONGATION |
| WIRE | REMARK | (μm) | (%) | 5 | 10 | 15 | (MPa) | (MPa) | (%) |
| INVENTIVE 1 | CONTINUED FROM TABLE 1 | 1.4 | 8.5 | A | A | A | 606 | 785 | 19.8 |
| 2 | | 1.5 | 7.9 | A | A | A | 647 | 796 | 21.2 |
| 3 | | 1.6 | 9.7 | A | A | A | 675 | 793 | 21.5 |
| 4 | | 2.5 | 15.9 | A | A | A | 697 | 823 | 21.5 |
| 5 | | 1.5 | 7.2 | A | A | A | 631 | 786 | 21.3 |
| 6 | | 1.4 | 5.5 | A | A | A | 607 | 767 | 20.2 |
| 7 | | 0.6 | 2.2 | A | A | A | 570 | 737 | 19.3 |
| 8 | | 1.4 | 6.5 | A | A | A | 624 | 778 | 19.6 |
| 9 | | 1.5 | 7.4 | A | A | A | 635 | 787 | 20.6 |
| 10 | | 1.4 | 6.6 | A | A | A | 623 | 777 | 19.9 |
| 11 | | 1.4 | 5.7 | A | A | A | 605 | 789 | 20.5 |
| 12 | | 1.4 | 4.9 | A | A | A | 616 | 758 | 18.1 |
| 13 | | 1.4 | 8.2 | A | A | A | 652 | 798 | 19.1 |
| 14 | | 1.4 | 6.4 | A | A | A | 622 | 777 | 20.1 |
| 15 | | 1.4 | 4.9 | A | A | A | 639 | 788 | 19.4 |

TABLE 5

| WIRE | | REMARK | M₆C TYPE AND MC TYPE CARBIDE | | ABSENCE OR EXISTENCE OF WELD-METAL CRACKING IN ACCORDANCE WITH DIFFERENCE IN WELDING SPEED WELDING SPEED (cm/min.) | | | HIGH-TEMPERATURE TENSILE TEST | | |
|---|---|---|---|---|---|---|---|---|---|---|
| | | | AVERAGE GRAIN DIAMETER (μm) | AREA RATIO (%) | 5 | 10 | 15 | 0.2% PROOF STRESS (MPa) | TENSILE STRENGTH (MPa) | FRACTURE ELONGATION (%) |
| INVENTIVE | 16 | CON- | 1.5 | 7.4 | A | A | A | 626 | 777 | 20.3 |
| | 17 | TINUED | 1.5 | 8.2 | A | A | A | 639 | 787 | 20.7 |
| | 18 | FROM | 1.6 | 9.2 | A | A | A | 656 | 799 | 18.8 |
| | 19 | TABLE 2 | 1.4 | 6.4 | A | A | A | 613 | 761 | 21.3 |
| | 20 | | 1.4 | 6.5 | A | A | A | 615 | 768 | 18.2 |
| | 21 | | 1.5 | 8.0 | A | A | A | 635 | 786 | 21.4 |
| | 22 | | 1.3 | 4.8 | A | A | A | 587 | 747 | 18.9 |
| | 23 | | 1.5 | 7.3 | A | A | A | 626 | 777 | 20.3 |
| | 24 | | 1.4 | 6.4 | A | A | A | 610 | 766 | 20.6 |
| | 25 | | 1.4 | 6.4 | A | A | A | 606 | 765 | 21.3 |
| | 26 | | 1.5 | 7.3 | A | A | A | 629 | 778 | 13.6 |
| | 27 | | 1.4 | 6.4 | A | A | A | 619 | 776 | 21.1 |
| | 28 | | 1.5 | 7.3 | A | A | A | 629 | 783 | 20.6 |
| COMPAR- | 1 | | 1.4 | 6.8 | B | B | B | — | — | — |
| ATIVE | 2 | | 1.6 | 2.4 | A | A | A | 422 | 654 | 25.1 |
| | 3 | | 1.4 | 6.2 | B | B | B | — | — | — |
| | 4 | | 1.5 | 3.3 | A | A | A | 409 | 650 | 26.0 |

TABLE 6

| WIRE | | REMARK | M₆C TYPE AND MC TYPE CARBIDE | | ABSENCE OR EXISTENCE OF WELD-METAL CRACKING IN ACCORDANCE WITH DIFFERENCE IN WELDING SPEED WELDING SPEED (cm/min.) | | | HIGH-TEMPERATURE TENSILE TEST | | |
|---|---|---|---|---|---|---|---|---|---|---|
| | | | AVERAGE GRAIN DIAMETER (μm) | AREA RATIO (%) | 5 | 10 | 15 | 0.2% PROOF STRESS (MPa) | TENSILE STRENGTH (MPa) | FRACTURE ELONGATION (%) |
| COMPAR- | 5 | CON- | 1.7 | 11.2 | A | B | B | 689 | 847 | 11.0 |
| ATIVE | 6 | TINUED | 1.1 | 2.3 | A | A | A | 440 | 664 | 24.6 |
| | 7 | FROM | 1.7 | 12.9 | A | B | B | 718 | 873 | 10.9 |
| | 8 | TABLE 3 | 1.0 | 1.8 | A | A | A | 396 | 637 | 25.2 |
| | 9 | | 1.7 | 11.1 | B | B | B | — | — | — |
| | 10 | | 1.2 | 3.0 | A | A | A | 375 | 631 | 26.7 |
| | 11 | | 1.6 | 10.2 | B | B | B | — | — | — |
| | 12 | | 1.3 | 4.0 | A | A | A | 400 | 648 | 26.7 |
| | 13 | | 1.7 | 11.8 | A | B | B | 703 | 844 | 10.6 |
| | 14 | | 0.8 | 1.7 | A | A | B | 468 | 668 | 22.8 |
| | 15 | | 1.7 | 13.7 | A | B | B | 729 | 869 | 10.8 |
| | 16 | | 0.8 | 1.5 | A | A | A | 358 | 614 | 25.5 |
| | 17 | | 4.5* | 8.4 | B | B | B | — | — | — |
| | 18 | | 1.6 | 16.5* | B | B | B | — | — | — |
| CONVENTIONAL | | | 0.6 | 0.2 | B | B | B | 257 | 533 | 31.9 |

*MARK DENOTES A VALUE OUTSIDE THE RANGE OF THE PRESENT INVENTION

From the results show in Tables 1 to 6, it can be understood that the inventive wires 1 to 28 generate no weld-metal cracking under the high-speed welding, and provide weld-zones having excellent high-temperature strength compared to Comparative wires 1 to 18, and the Conventional wire.

While preferred embodiments of the invention have been described and illustrated above, it should be understood that these are exemplary of the invention and are not to be considered as limiting. Additions, omissions: substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

When a Ni-based heat resistant alloy is subjected to high-speed welding, it is possible to provide a weld-zone showing no weld-metal cracking and having excellent high-temperature strength by using the wire of the present invention. Therefore, high-speed welding was enabled in the time of producing or repairing various mechanical pats made of a Ni-based heat resistant alloy by welding, thereby realizing a rapid welding operation and reduction of cost.

The invention claimed is:
1. A wire for welding Ni-based heat resistant alloy, the wire comprising a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, B: 0.0001 to 0.020%, and C: 0.03 to 0.15%, with the balance being Ni and unavoidable impurities, wherein contents of S and P contained in the unavoidable impurities are controlled to be, in mass %, S: 0.004% or less, and P: 0.010% or less, wherein the wire has a texture in which $M_6C$ type carbide and MC type carbide are uniformly dispersed in γ phase matrix, wherein the $M_6C$ type carbide and the MC type carbide are uniformly dispersed in the matrix at a total proportion of 0.5 to 16.0 area %, wherein the M in the $M_6C$ type carbide has a composition containing, in mass %, Ni: 12.0 to 45.0%, Cr: 9.0 to 22.0%, Co: 0.5 to 13.5%, W: 2.0 to 24.0%, Al: 5.0% or less, and Ti: 0.5 to 6.0%, with the balance being Mo and unavoidable impurities, and wherein the M in the MC type carbide has a composition containing, in mass %, Ni: 7.0% or less, Cr: 6.0% or less, Co: 12.0% or less, Mo: 57.0% or less, W: 15% or less, and Al: 6.0% or less, with the balance being Ti and unavoidable impurities.

2. A wire for welding Ni-based heat resistant alloy, the wire comprising a composition containing, in mass %, Cr: 14.0 to 21.5%, Co: 6.5 to 14.5%, Mo: 6.5 to 10.0%, W: 1.5 to 3.5%, Al: 1.2 to 2.4%, Ti: 1.1 to 2.1%; Fe: 7.0% or less, Nb: 0.1 to 1.0%, B: 0.0001 to 0.020%, and C: 0.03 to 0.15%, with the balance being Ni and unavoidable impurities, wherein contents of S and P contained in the unavoidable impurities are controlled to be, in mass %, S: 0.004% or less, and P: 0.010% or less, wherein the wire has a texture in which $M_6C$ type carbide and MC type carbide are uniformly dispersed in γ phase matrix, wherein the $M_6C$ type carbide and the MC type carbide are uniformly dispersed in the matrix at a total proportion of 0.5 to 16.0 area %, wherein the M in the $M_6C$ type carbide has a composition containing, in mass %, Ni: 12.0 to 45.0%, Cr: 9.0 to 22.0%, Co: 0.5 to 13.5%, W: 2.0 to 24.0%, Al: 5.0% or less, Ti: 0.5 to 6.0%, and Nb: 1.0% or less, with the balance being Mo and unavoidable impurities, and wherein the M in the MC type carbide has a composition containing, in mass %, Ni: 7.0% or less, Cr: 6.0% or less, Co: 12.0% or less, Mo: 57.0% or less, Nb: 65% or less, W: 15% or less, and Al: 6.0% or less, with the balance being Ti and unavoidable impurities.

3. The wire for welding Ni-based heat resistant alloy according to claim 1, wherein the $M_6C$ type carbide and the MC type carbide each have an average grain diameter of 0.3 to 4.0 μm.

4. The wire for welding Ni-based heat resistant alloy according to claim 1, wherein the wire for welding Ni-based heat resistant alloy is a wire for TIG welding or MIG welding.

5. The wire for welding Ni-based heat resistant alloy according to claim 3, wherein the wire for welding Ni-based heat resistant alloy is a wire for TIG welding or MIG welding.

6. The wire for welding Ni-based heat resistant alloy according to claim 2, wherein the $M_6C$ type carbide and the MC type carbide each have an average grain diameter of 0.3 to 4.0 μm.

7. The wire for welding Ni-based heat resistant alloy according to claim 2, wherein the wire for welding Ni-based heat resistant alloy is a wire for TIG welding or MIG welding.

* * * * *